United States Patent
Miao

(10) Patent No.: US 7,751,378 B2
(45) Date of Patent: Jul. 6, 2010

(54) METHOD, APPARATUS AND SYSTEM FOR CLIENT-BASED DISTRIBUTED PBX FOR ENTERPRISE TELEPHONY

(75) Inventor: Kai X. Miao, Beijing (CN)

(73) Assignee: Intel Corporation, Santa Clara, CA (US)

(*) Notice: Subject to any disclaimer, the term of this patent is extended or adjusted under 35 U.S.C. 154(b) by 894 days.

(21) Appl. No.: 11/394,787

(22) Filed: Mar. 31, 2006

(65) Prior Publication Data

US 2007/0263831 A1   Nov. 15, 2007

(51) Int. Cl.
*H04L 12/56* (2006.01)
*G06F 15/16* (2006.01)
*H04W 4/00* (2009.01)

(52) U.S. Cl. .................. 370/338; 370/400; 709/227

(58) Field of Classification Search .................. None
See application file for complete search history.

(56) References Cited

U.S. PATENT DOCUMENTS

| | | | |
|---|---|---|---|
| 7,162,236 B2 * | 1/2007 | Dorenbosch et al. | 455/432.1 |
| 7,496,188 B2 * | 2/2009 | Saha et al. | 379/202.01 |
| 7,525,955 B2 * | 4/2009 | Velez-Rivera et al. | 370/352 |
| 2004/0264410 A1 * | 12/2004 | Sagi et al. | 370/331 |
| 2007/0050451 A1 * | 3/2007 | Caspi et al. | 709/204 |
| 2007/0094374 A1 * | 4/2007 | Karia et al. | 709/223 |
| 2008/0086564 A1 * | 4/2008 | Putman et al. | 709/227 |

* cited by examiner

*Primary Examiner*—Pankaj Kumar
*Assistant Examiner*—Marcus R Smith
(74) *Attorney, Agent, or Firm*—Blakely, Sokoloff, Taylor & Zafman LLP

(57) ABSTRACT

A system and associated processes to provide interactive public branch exchange (PBX) processes. The PBX processes including: session initiation protocol (SIP) processes, application processes, and an interface with signaling process. The media processes cause the machine to: perform an audio/video play process, perform a record process, and perform a mixing process.

8 Claims, 4 Drawing Sheets

METHOD, APPARATUS AND SYSTEM FOR CLIENT-BASED DISTRIBUTED PBX FOR ENTERPRISE TELEPHONY

BACKGROUND

1. Field

The embodiments relate to Internet Protocol (IP) Private Branch Exchange (PBX), and more particularly to non-centralized distributed IP PBX complete platforms.

2. Description of the Related Art

Office PBX has always been a standalone centralized system entity, dating back to the "switch" concept in Public Switched Telephone Network (PSTN), where a centralized switch/system is responsible for receiving, connecting, and distributing telephone calls inside an office building over time-division multiplexing (TDM) circuits connected to it. With the advent and proliferation of IP networks in the enterprise, a new breed of PBX has emerged, IP PBX, which performs the same functionality as the traditional TDM/PSTN PBX but operating on top of the IP network using Voice over IP (VoIP) technology.

IP PBX, however, inherited the same centralized control model of the TDM/PSTN PBX and is implemented in the form of a centralized system (more specifically, the combination of an application server and a media server, often co-located in the same platform, with additional servers handling centralized control functions). FIG. 1 illustrates a centralized IP PBX system. System 100 includes enterprise IP network 101 that includes application server 105, interactive voice response (IVR) server 110, presence server 115, conferencing server 120, session initiation protocol (SIP) registrar 125, SIP proxy 130, SIP redirect server 135, and SIP electronic number mapping (ENUM) server 140. Connected to enterprise IP network 101 are multiple SIP clients 150 and personal computer (PC) soft clients 155.

A centralized system has a numerous disadvantages, including the introduction of a single point of failure in the enterprise telephony system and the inability to scale in density, etc. IP PBX systems, in particular, suffer from their severe density limitations and scale very poorly, due to the media processing bottleneck in the centralized servers.

BRIEF DESCRIPTION OF THE DRAWINGS

The embodiments are illustrated by way of example, and not by way of limitation, in the figures of the accompanying drawings and in which like reference numerals refer to similar elements and in which.

DETAILED DESCRIPTION

The embodiments discussed herein generally relate to non-centralized distributed IP PBX complete platforms. Referring to the figures, exemplary embodiments will now be described. The exemplary embodiments are provided to illustrate the embodiments and should not be construed as limiting the scope of the embodiments.

Figure 1:
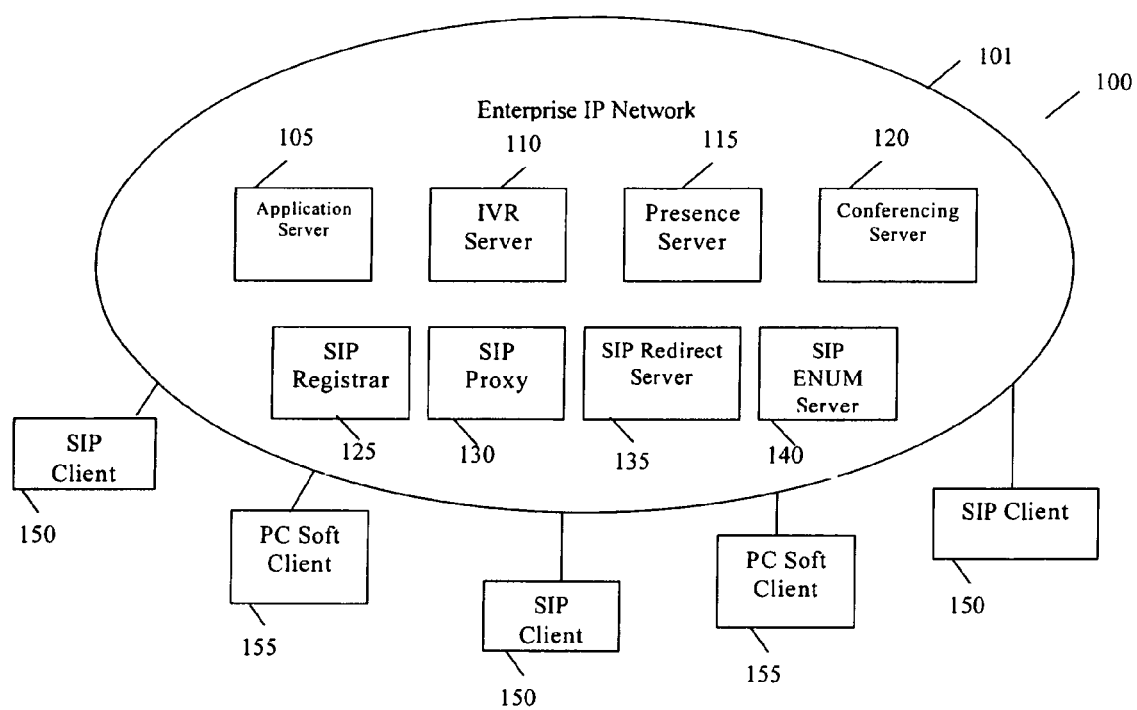
FIG. 1 illustrates a centralized Internet Protocol (IP) Private Branch Exchange (PBX) system.
Figure 2A:
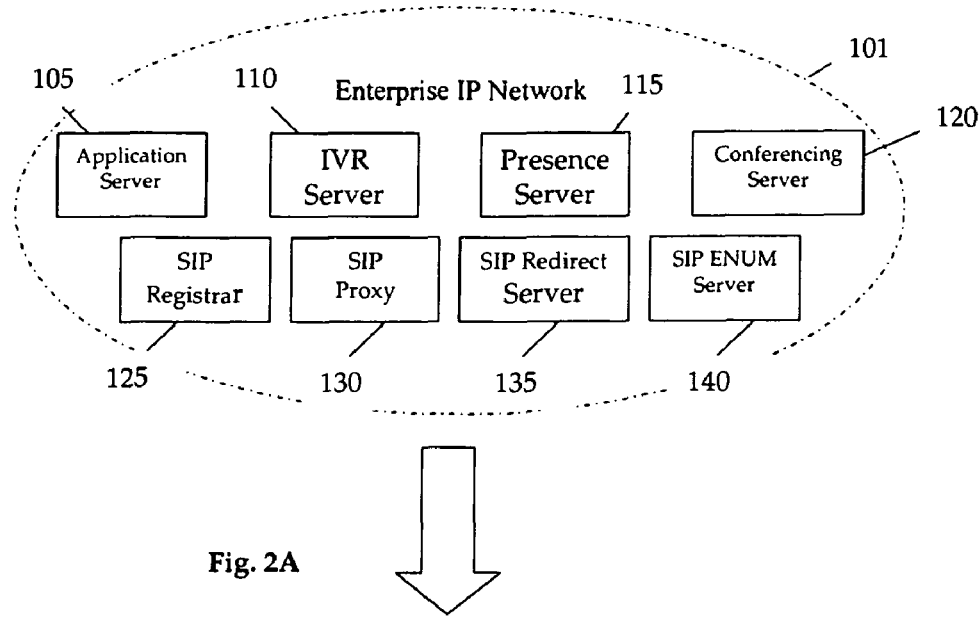
FIG. 2A illustrates network servers for an IP PBX system.
Figure 2B:
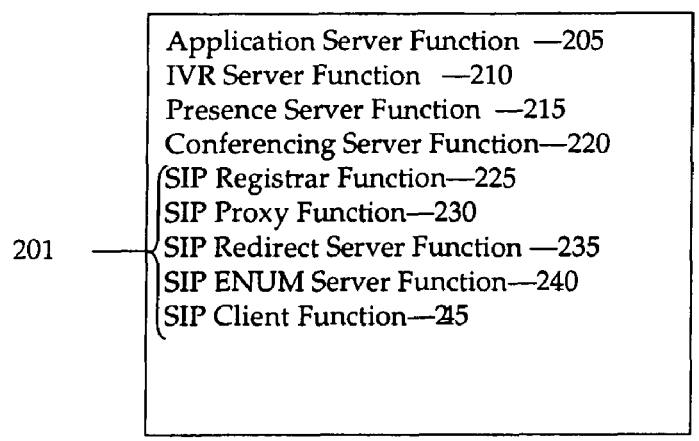
FIG. 2B illustrates distributed network server functions and a client function.
Figure 2C:
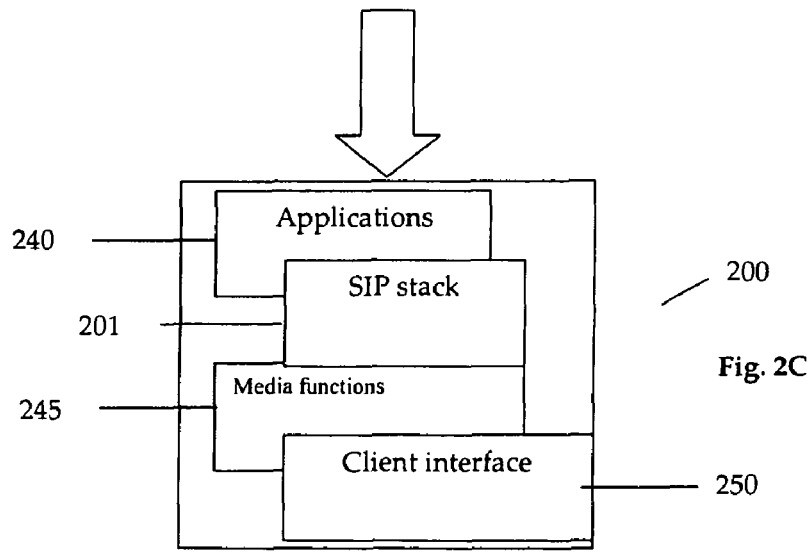
FIG. 2C illustrates an embodiment including a platform including a session initiation protocol (SIP) client and distributed IP PBX network server functions.

FIG. 2A-C illustrate transformation from a centralized enterprise IP network 101 to a platform (e.g., a personal computer (PC), notebook, laptop, hand held device (e.g., palm computer, cellular telephone, etc.)) including distributed network server functions and an SIP client. As illustrated in FIG. 2B, application server 105 is replaced with application server function 205. In one embodiment, application server function 205 is comprised of software functions or routines that emulate or reproduce the functionality of application server 105. In another embodiment, application server function 205 is embodied in hardware or firmware.

IVR server 110 is replaced with IVR server function 210. In one embodiment, IVR server function 210 is comprised of software functions or routines that emulate or reproduce the functionality of IVR server 110. In another embodiment, IVR server function 110 is embodied in hardware or firmware.

Presence server 115 is replaced with presence server function 215. In one embodiment, presence server function 215 is comprised of software functions or routines that emulate or reproduce the functionality of presence server 115. In another embodiment, presence server function 215 is embodied in hardware or firmware.

Conferencing server 120 is replaced with conferencing server function 220. In one embodiment, conferencing server function 220 is comprised of software functions or routines that emulate or reproduce the functionality of conferencing server 120. In another embodiment, conferencing server function 220 is embodied in hardware or firmware.

SIP registrar 125 is replaced with SIP registrar function 225. In one embodiment, SIP registrar function 225 is comprised of software functions or routines that emulate or reproduce the functionality of SIP registrar 125. In another embodiment, SIP registrar function 225 is embodied in hardware or firmware.

SIP proxy 130 is replaced with SIP proxy function 230. In one embodiment, SIP proxy function 230 is comprised of software functions or routines that emulate or reproduce the functionality of SIP proxy 130. In another embodiment, SIP proxy function 230 is embodied in hardware or firmware.

SIP redirect server 135 is replaced with SIP redirect server function 235. In one embodiment, SIP redirect server function 235 is comprised of software functions or routines that emulate or reproduce the functionality of SIP redirect server 135. In another embodiment, SIP redirect server function 235 is embodied in hardware or firmware.

SIP ENUM server 140 is replaced with SIP ENUM server function 240. In one embodiment, SIP ENUM server function 240 is comprised of software functions or routines that emulate or reproduce the functionality of SIP ENUM server 140. In another embodiment, SIP ENUM server function 240 is embodied in hardware or firmware.

SIP client function 235 is included with the network server functions and SIP stack 201. SIP client function interfaces with the other functions in the SIP stack 201.

FIG. 2C illustrates an IP PBX integrated platform 200. Platform 200 includes enterprise IP transformed applications, such as application server function 205, IVR server function 210, presence server function 215, conferencing server function 220 and speech services (e.g., language conversion, language preference, etc.). Also included in platform 200 are media functions 245 and client interface 250. Integrated platform 200 can be operated in any single stand alone platform, such as a PC, notebook, laptop, hand held device (e.g., palm computer, cellular telephone, etc.)), etc.

In this embodiment the centralized control model of PBX systems is abolished. That is, the functionalities of a traditional PBX are decentralized. In one embodiment platform 200 can be distributed for private exchange. In this embodiment the centralized PBX, or enterprise telephony servers, are no longer needed and a new office telephony system, one that is distributed over platforms, such as office PCs and IP phones, can be used in enterprise networks.

Figure 3:
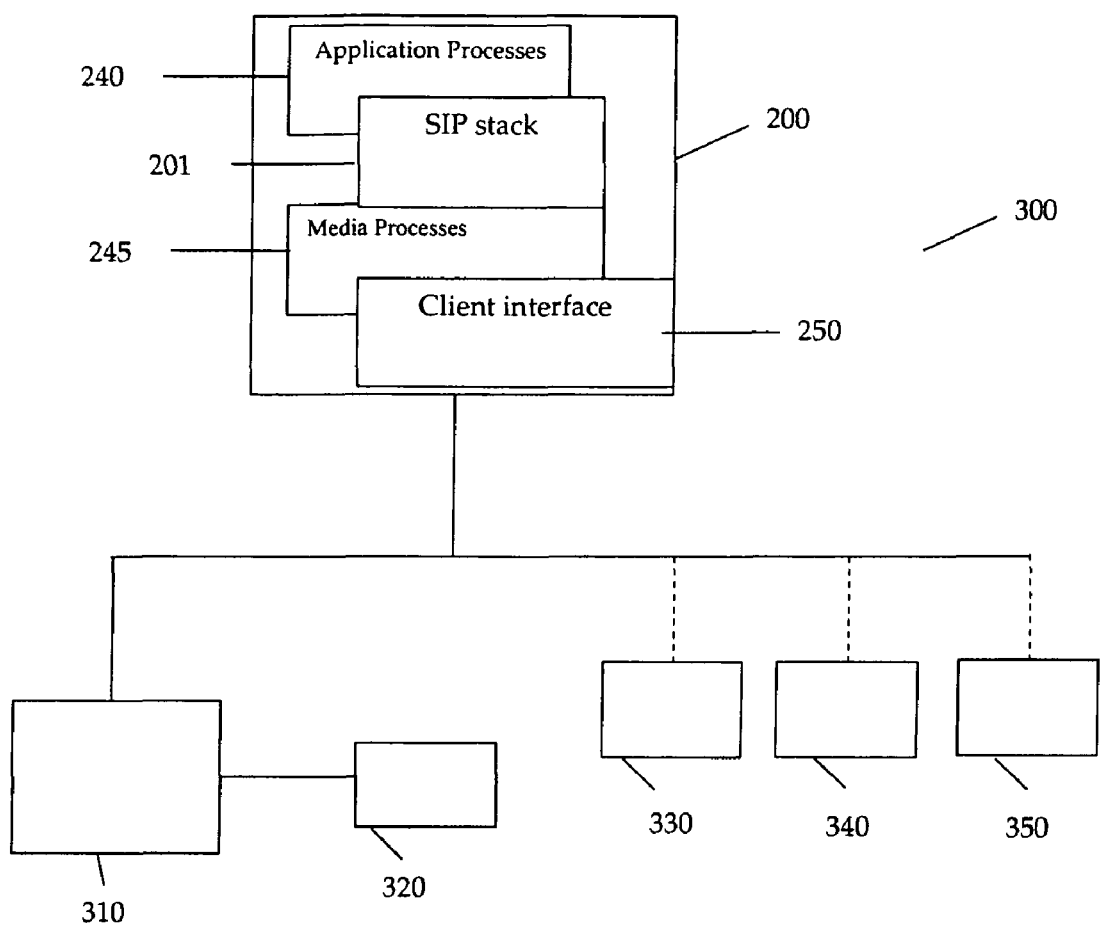
FIG. 3 illustrates an embodiment of a platform including a SIP client and distributed IP PBX network server functions.

FIG. 3 illustrates an embodiment of a device including platform 200. This embodiment includes processor 310 and memory 320. In one embodiment memory 320 can be local random access memory (RAM), synchronous RAM (SRAM), dynamic RAM (DRAM), fast page mode DRAM (FPM DRAM), Extended Data Out DRAM (EDO DRAM), Burst EDO DRAM (BEDO DRAM), erasable programmable ROM (EPROM) also known as Flash memory, etc.

In one embodiment, device 300 can include an interface to connect with a USB telephone 330, a telephone headset 340 or an SIP telephone 350 used in a PBX call by a user. In one embodiment, platform 200 is software that is run by processor 310 in memory 320. In another embodiment, platform 200 is hardware, firmware or both that communicates with processor 310. In another embodiment platform 200 is comprised of software and hardware that communicates with processor 310.

Figure 4:
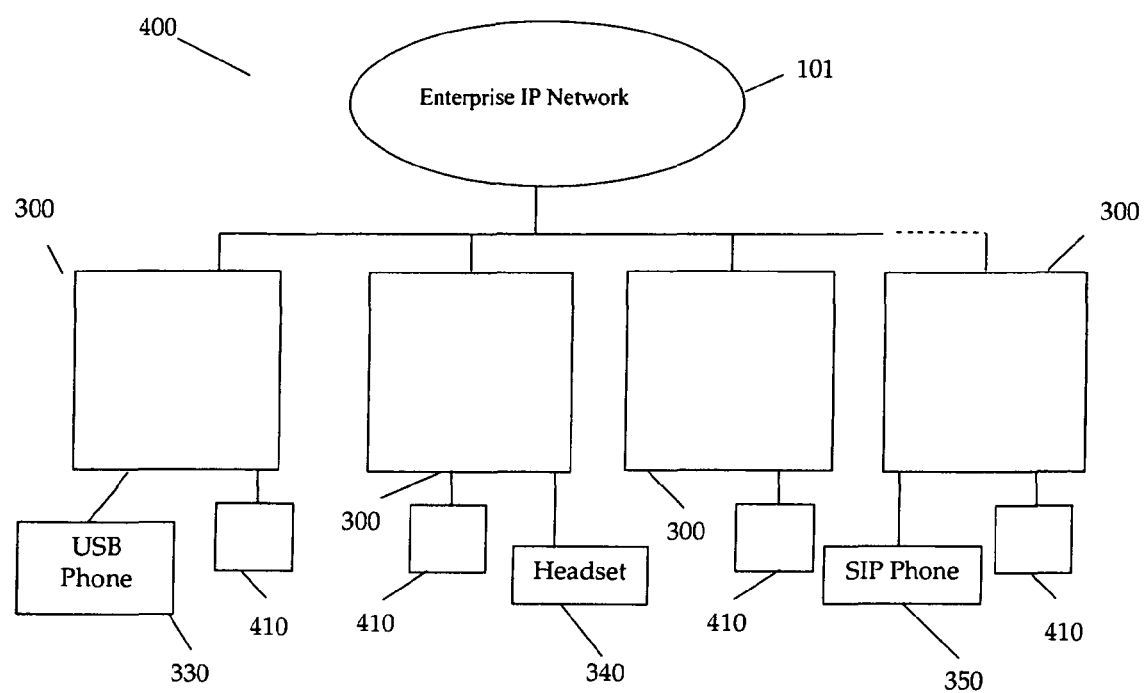
FIG. 4 illustrates an enterprise IP network system including a plurality of platforms including SIP clients and distributed IP PBX network server functions.

FIG. 4 illustrates network 400 including enterprise IP network 101 and many devices 300 connected to the network. In this embodiment, each device 300 includes a display 410. Display 410 can be any typical display appropriate for a specific platform. That is, display 410 can be a display connected to PC, notebook, laptop, hand held device (e.g., palm computer, cellular telephone, etc.)), etc. Display 410 can be an analog electronic displays, a cathode ray tube (CRT), a digital electronic display a vacuum fluorescent (VF) display, a light emitting diode (LED) display, a plasma display (PDP), a liquid crystal display (LCD), a high performance addressing (HPA) display, a thin-film transistor (TFT) display, an organic LED (OLED) display, a heads-up display (HUD), a projector display, etc.

Each device 300 in the network performs media processing functions so that multi-party conferencing is supported without a centralized media server, i.e., each device 300 mixes multiple media streams (after decoding these streams) and then transmits encoded streams to the conferencing parties (including the local party). In this distributed PBX network architecture, device 300 plays a central role because it directly interacts with external callers, serves an office worker using a (local) phone client/terminal, and performs all call features or functions without the help from a traditional PBX server. That is, device 300 can make/receive calls from any other device 300 without using PBX centralized servers.

Each device 300 includes SIP stack 201 processes including SIP a user agent and SIP server processes. SIP stack 201 is able to handle SIP call signaling, user registrations, call redirect and call routing. In this embodiment SIP stack 201 not only works for the client (performing the traditional call signaling and control) but also carries out call control functions associated with an SIP proxy, an SIP redirect server, and an SIP registrar, which removes the need of SIP servers in the network.

In one embodiment network configuration rules and schemes are used to help call distribution, system utilization, and network optimization in network 400. In one embodiment techniques such as Distributed Hash Tables (DHT) are used in user registration functions to optimize user registration and search.

In this embodiment device 300 interacts with other SIP clients, servers, proxies, or ENUM servers, etc. In other words, device 300 interfaces with other SIP clients or SIP servers seamlessly regardless of whether they are SIP clients or any other SIP entities in the traditional sense.

Device 300 has application level intelligence fully localized for handling functions, such as conferencing control, call agent/IVR control, presence control, etc. In other words, device 300 functions as an announcement server, conferencing server, IVR server, presence server, and a speech services engine, in addition to being a SIP user agent. Note, with system 400's distributed architecture, the number of calls handled by each client is much less than that for a typical server. For example, while an announcement server is typically required to handle a large number of callers, an announcement function in an enhanced SIP client in this embodiment only needs to handle a few callers at a time as the number of people who would call a single person in an enterprise is very limited. The same is true for all other server functions.

In this embodiment device 300 performs media processing functions, required not only for a single SIP user agent but also for a media server, including audio/video play, record, and mixing. In particular, device 300 carries out the decoding and encoding, encrypting and decrypting, handling real-time transport protocol (RTP) and real-time transport control protocol (RTCP) packets, and provides jitter buffering, etc., all for multiple RTP streams within a single RTP session. Note, because the number of streams a client is required to handle is very low in a media server function (i.e., media functions 245) with such a distributed architectural network 400, the bottleneck often associated with media processing in PBX 101 is now removed. Thus making this embodiment scalable and reliable.

Device 300 has local media and signaling interfaces to SIP devices and supports external standalone client devices, such as SIP phones with either wired or wireless media. Device 300 is the center for communications which fully serves an office worker via various types of user interface convenient to the worker, on the network side as well as the user side.

With system 400, device 300 usage increases over devices, such as a typical PC as device 300 can become a center-piece in enterprise multimedia communications. And, if device 300 is a handheld device, (e.g., PDAs and WiFi/WiMAX devices) system 400 can also be increase their use as well. In this embodiment, enterprise telephony switching reliability and scalability is improved over the traditional network. In this embodiment telephony and data (communication) integration is improved.

In typical office environments, a telephone is used for voice conversation and a PC is used for data access (websites, email, etc). Because the telephone system and the data system are separated, a central switching system is required to handle various telephony services. With the convergence between voice and data in the office and the increased computing power of the PC, in system 400 each device 300 (such as an office PC) can perform its own telephony switching and call functions. In system 400, a device 300 in an office would directly initiate or receive a call, without the intervention of a server such as a PBX, and handles various features of the call directly (for example, ring the phone, play announcement, hold a conference, carry out call waiting or call transfer, etc).

System 400 has profound implications as compared with the typical enterprise system. System 400 renders more control and processing power to client terminals for functionalities that are only carried out by server systems in the current enterprise systems in industry today, thus allowing client component/platform manufacturers to significantly grow their total available market. In particular, because of the dominate use of devices 300, such as PCs, in network 400, such architecture can generate new usages for the PC.

Another embodiment includes a method of performing a interactive PBX processes in a first platform. The PBX processes include initiating a PBX call with a SIP and signaling at least a second platform that includes the same or similar PBX processes. The first and second platform include distributed PBX processes and perform stand-alone direct PBX communication with each other over a network without using centralized PBX servers or software.

The method further includes processing media streams in either the first or second platform and interfacing with local media on either the first or second platform. In one embodiment initiating a PBX call further includes performing an SIP user agent process, performing a SIP server processes, performing an SIP proxy process, performing an SIP redirect process, and performing an SIP registrar process.

In one embodiment the method further includes controlling a conference call and providing a call agent/interactive voice response (IVR). The method further provides playing audio/video streams on either the first platform or the second platform, recording audio/video streams on either the first platform or the second platform, and mixing media streams on either the first platform or the second platform.

In one embodiment the method further provides encoding media streams on either the first or the second platform, decoding media streams on either the first or the second platform, encrypting media streams on either the first or the second platform, and decrypting media streams on either the first or the second platform. The method also includes interfacing with a universal serial bus (USB) device, a headset device or an SIP telephone device to interact with the of PBX processes. The method further includes announcing a call on either the first platform or the second platform, determining presence on either the first platform or the second platform, and servicing speech on either the first platform or the second platform.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, can be implemented in assembly or machine language if desired. The language may be compiled or interpreted. Additionally, these techniques may be used in a wide variety of networking environments. Such computer programs may be stored on a non-transitory storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable or machine recordable storage medium, configured for use with a processing system, where the storage medium so configured causes the processing system to operate in a specific and predefined manner to perform the functions described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. An apparatus to operate as a session initiation protocol (SIP) client device comprising:
a processor executing applications to provide the SIP client device with localized application level intelligence for announcement, conferencing, IVR presence and a speech services engine in addition to being a SIP user agent;
a memory coupled to the processor, the processor operates to execute a plurality of public branch exchange (PBX) processes in the memory that interact together to provide a distributed PBX platform to provide multi-party conferencing without a centralized media server, wherein the plurality of PBX processes include:
a plurality of SIP stack processes comprising an SIP user agent process, a plurality of SIP server processes; an SIP proxy process, an SIP redirect process, and an SIP registrar process,
a plurality of application processes;
a plurality of media processing processes including:
an audio/video play process;
a mixing process;
a record process;
an encoding process;
a decoding process;
an encrypting process; and
a decrypting process;
a local media interface; and
a signaling interface.

2. The apparatus of claim 1, the plurality of application processes comprising:
a conferencing control process; and
a call agent/interactive voice response (IVR) process.

3. The apparatus of claim 1, further comprising:
one of a universal serial bus (USB) device, a headset device and an SIP telephone device to interact with the plurality of PBX processes.

4. A non-transitory machine accessible medium containing instructions that, when executed, cause a machine to:
- execute applications to provide a session initiation protocol (SIP) client device with localized application level intelligence for announcement, conferencing, IVR presence and a speech services engine in addition to being a SIP user agent
- perform a plurality of interactive public branch exchange (PBX) processes, the plurality of PBX processes including: a plurality of session initiation protocol (SIP) processes; a plurality of application processes to provide multi-party conferencing without a centralized media server, wherein the SIP processes further cause the machine to: perform an SIP user agent process, perform a plurality of SIP server processes, perform an SIP proxy process, perform an SIP redirect process, and perform an SIP registrar process; and
- an interface with signaling process, wherein the plurality of media processes further cause the machine to: perform an audio/video play process; perform a record process; and perform a mixing process.

5. The machine accessible medium of claim 4, further containing instructions that, when executed, cause the machine to:
- perform media processing processes; and
- interface with local media.

6. The machine accessible medium of claim 4, wherein the application processes further cause the machine to:
- perform a conferencing control process; and
- perform a call agent/interactive voice response (UVR) process.

7. The machine accessible medium of claim 4, wherein the plurality of media processes further cause the machine to:
- perform an encoding process;
- perform a decoding process;
- perform an encrypting process; and
- perform a decrypting process.

8. The machine accessible medium of claim 4, further including instructions to cause the machine to:
- interface with one of a universal serial bus (USB) device, a headset device and an SIP telephone device to interact with the plurality of PBX processes.

* * * * *